(12) United States Patent
Greenwood et al.

(10) Patent No.: US 8,979,059 B2
(45) Date of Patent: Mar. 17, 2015

(54) RATCHET PLATFORM

(71) Applicants: Kyle L. Greenwood, Bryan, TX (US);
Bobby D. Melvin, Bryan, TX (US)

(72) Inventors: Kyle L. Greenwood, Bryan, TX (US);
Bobby D. Melvin, Bryan, TX (US)

(73) Assignee: Black Mountain Industries, Inc.,
Bryan, TX (US)

( * ) Notice: Subject to any disclaimer, the term of this patent is extended or adjusted under 35 U.S.C. 154(b) by 0 days.

(21) Appl. No.: 14/151,547

(22) Filed: Jan. 9, 2014

(65) Prior Publication Data

US 2014/0124640 A1      May 8, 2014

Related U.S. Application Data

(63) Continuation of application No. 13/631,978, filed on Sep. 29, 2012, now Pat. No. 8,657,247, which is a continuation-in-part of application No. 12/245,861, filed on Oct. 6, 2008, now Pat. No. 8,590,853.

(51) Int. Cl.
*F16M 13/00*      (2006.01)
*B66F 1/06*       (2006.01)
*F16M 11/20*      (2006.01)

(52) U.S. Cl.
CPC . *B66F 1/06* (2013.01); *F16M 11/20* (2013.01)
USPC .................. 248/423; 248/354.7; 297/344.18; 297/474

(58) Field of Classification Search
CPC ........ B60N 2/24; B60N 2/167; B60N 2/4242; B60N 2/502; B60N 2002/247; B60N 2/164; B60N 2/169; F41H 7/046; B60R 22/26; F16M 11/28; A47C 3/26; A61B 19/28
USPC ................ 248/161, 423, 354.7, 125.1, 125.2, 248/125.3, 352; 297/344.18, 474
See application file for complete search history.

(56) References Cited

U.S. PATENT DOCUMENTS

| 228,518 | A | * | 6/1880 | Dawes | .......................... | 108/147 |
| 298,625 | A | * | 5/1884 | Saunders | ...................... | 248/647 |
| 1,242,024 | A | * | 10/1917 | Nichols | ...................... | 248/125.3 |
| 1,518,600 | A | * | 12/1924 | Nolen | .............................. | 254/1 |
| 2,442,375 | A | | 6/1948 | Paxton | | |
| 2,527,905 | A | * | 10/1950 | Barecki | ......................... | 248/421 |

(Continued)

OTHER PUBLICATIONS

USPTO Office Action for U.S. Appl. No. 14/064,038 dated May 6, 2014.

(Continued)

*Primary Examiner* — Bradley Duckworth
(74) *Attorney, Agent, or Firm* — Tumey L.L.P.

(57) ABSTRACT

A ratchet platform is vertically adjustable and supports a soldier standing thereupon. The ratchet platform has a platform upper assembly having a platform and a ratchet. The ratchet has a platform riser tube and a ratchet rail. The ratchet platform also has a platform lower assembly having a support column and a platform base. An end of the ratchet is proximate the platform and an opposing end of the ratchet is disposed within an interior of the support column. The ratchet platform has a platform upper assembly actuator having a pedal sub-assembly and an upper linkage. Actuation of the upper linkage actuates the ratchet to adjust the height of the ratchet platform. The ratchet platform also has a base plate secured to the vehicle floor. The ratchet platform has a seat plate which provides support to the platform upper assembly, the platform lower assembly, and an energy attenuation system.

19 Claims, 15 Drawing Sheets

(56) References Cited

U.S. PATENT DOCUMENTS

| | | | |
|---|---|---|---|
| 2,556,076 A | 6/1951 | Evans et al. | |
| 2,829,702 A | 4/1958 | Keating | |
| 2,834,401 A * | 5/1958 | Tanner | 248/423 |
| 2,935,120 A * | 5/1960 | Naus | 297/337 |
| 3,184,205 A | 5/1965 | Caarpezzi | |
| 3,314,720 A | 4/1967 | Millington et al. | |
| 3,625,563 A * | 12/1971 | Dickinson et al. | 297/333 |
| 3,653,715 A | 4/1972 | Drabert et al. | |
| 3,659,844 A | 5/1972 | Cummins | |
| 3,868,143 A | 2/1975 | Reilly | |
| 3,954,041 A * | 5/1976 | Mechulam et al. | 89/36.13 |
| 4,099,778 A | 7/1978 | Lehr | |
| 4,119,044 A * | 10/1978 | Hines | 108/27 |
| 4,139,215 A | 2/1979 | Buitard et al. | |
| 4,474,347 A | 10/1984 | Mazelsky | |
| 4,602,816 A | 7/1986 | Chandler | |
| 4,738,413 A | 4/1988 | Spinosa et al. | |
| 4,822,224 A | 4/1989 | Carl et al. | |
| 4,836,480 A * | 6/1989 | Besner | 248/125.3 |
| 4,856,747 A * | 8/1989 | Gano | 248/354.7 |
| 4,923,147 A * | 5/1990 | Adams et al. | 244/122 AG |
| 4,927,211 A | 5/1990 | Bolcerek | |
| 5,010,850 A | 4/1991 | Sailer | |
| 5,015,010 A | 5/1991 | Homeier et al. | |
| 5,039,054 A * | 8/1991 | Pai | 248/423 |
| 5,176,402 A * | 1/1993 | Coulon | 280/807 |
| 5,180,131 A * | 1/1993 | Few | 248/352 |
| 5,259,478 A | 11/1993 | Berish et al. | |
| 5,397,171 A | 3/1995 | Leach | |
| 5,533,934 A | 7/1996 | Miller | |
| 5,577,806 A | 11/1996 | Ugalde | |
| 5,642,916 A * | 7/1997 | Dybro et al. | 297/216.18 |
| 5,839,965 A | 11/1998 | Mullins | |
| 6,142,567 A | 11/2000 | Bentley | |
| D439,062 S | 3/2001 | McGinnis et al. | |
| 6,322,140 B1 | 11/2001 | Jessup et al. | |
| 6,409,243 B1 | 6/2002 | Hansen | |
| 6,467,576 B2 | 10/2002 | Figura et al. | |
| 6,481,777 B2 * | 11/2002 | Mans | 296/68.1 |
| 6,719,258 B2 * | 4/2004 | Bryngelson et al. | 248/419 |
| 6,725,855 B1 | 4/2004 | Brennan | |
| 6,913,314 B2 | 7/2005 | Hansen | |
| 7,100,991 B2 | 9/2006 | Schroth | |
| 7,175,233 B2 | 2/2007 | Greenwood et al. | |
| 7,269,963 B2 | 9/2007 | Yonekura et al. | |
| 7,293,818 B2 | 11/2007 | Kumpf et al. | |
| 7,413,247 B2 | 8/2008 | Van Druff et al. | |
| 7,758,095 B2 | 7/2010 | Elhanany | |
| 7,815,255 B1 | 10/2010 | Kiel et al. | |
| 8,011,730 B2 * | 9/2011 | Greenwood | 297/344.18 |
| 2004/0108165 A1 | 6/2004 | Poole et al. | |
| 2006/0207021 A1 * | 9/2006 | Brunson et al. | 5/81.1 R |
| 2007/0096526 A1 * | 5/2007 | Hentges | 297/344.12 |
| 2007/0281125 A1 | 12/2007 | Moore et al. | |
| 2010/0084897 A1 * | 4/2010 | Greenwood | 297/217.7 |
| 2010/0084907 A1 * | 4/2010 | Greenwood et al. | 297/483 |

OTHER PUBLICATIONS

USPTO Office Action for U.S. Appl. No. 13/631,976 dated Dec. 4, 2014.

USPTO Final Office Action for U.S. Appl. No. 13/631,976 dated May 7, 2014.

Notice of Allowance for U.S. Appl. No. 13/191,899 dated Jan. 30, 2014.

Notice of Allowance for U.S. Appl. No. 13/550,389 dated Jan. 24, 2014.

USPTO Office Action for U.S. Appl. No. 13/631,979 dated Apr. 17, 2014.

USPTO Final Office Action for U.S. Appl. No. 13/368,773 dated Apr. 9, 2014.

* cited by examiner

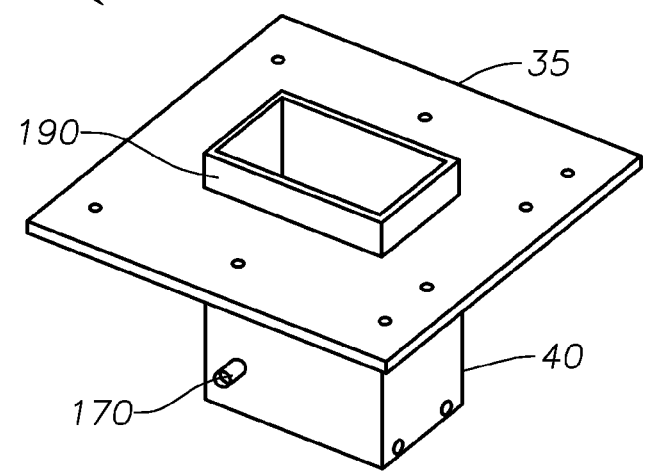
Fig. 7
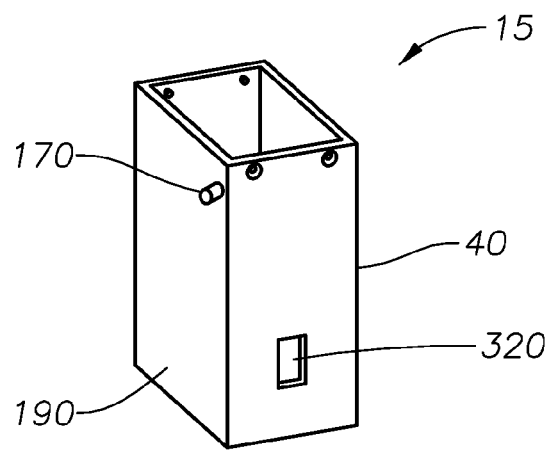
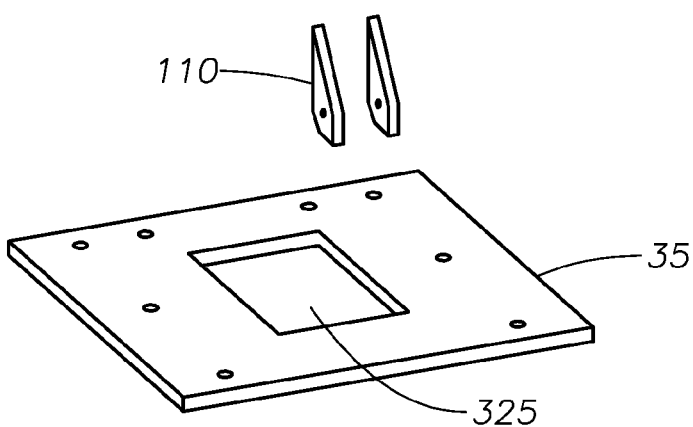
Fig. 8

RATCHET PLATFORM

CROSS-REFERENCE TO RELATED APPLICATIONS

This application is a continuation of U.S. application Ser. No. 13/631,978 filed Sep. 29, 2012, which is a continuation-in-part of U.S. Pat. No. 8,590,853 issued Nov. 26, 2013, which are both herein incorporated by reference in their entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of adjustable platforms and more specifically to the field of height adjustable platforms adapted for use in a military vehicle.

2. Background of the Invention

In many instances, occupants of vehicles need to stand up in the vehicle. For instance, in military vehicles, occupants of the military vehicles may need to stand in the vehicle with the upper portion of the occupants' bodies exposed outside of the vehicle. Such instances include the need to operate weaponry, improve vision outside of the military vehicle, and the like. Problems occur in such situations with the varying heights of the individuals.

Occupants of the vehicles have developed solutions such as standing on items to overcome problems with the varying heights. However, drawbacks to such solutions include the lack of stability during combat operations or rough terrain. Further drawbacks include problems with adjustments for the various heights of the vehicle occupants. In military vehicles, problems also include injuries to the standing occupant when the vehicle sustains the force of a mine or improvised explosive device. In such instances, a portion of the force is absorbed by the standing occupant's body causing severe injury or death.

Consequently, there is a need for a stable platform for a vehicle occupant. Further needs include a platform that is adjustable for varying occupant heights. Additional needs include improved protection for the occupant against explosive forces.

BRIEF SUMMARY OF SOME OF THE PREFERRED EMBODIMENTS

These and other needs in the art are addressed in one embodiment by a ratchet platform. The ratchet platform is height adjustable. The ratchet platform includes a platform upper assembly having a platform and a ratchet. The ratchet includes a platform riser tube and a ratchet rail secured to the platform riser tube. In addition, the ratchet platform includes a platform lower assembly having a support column and a platform base. The support column is secured to the platform base. An end of the ratchet is proximate the platform and an opposing end of the ratchet is disposed within an interior of the support column. The platform base is adapted to be attached to a vehicle. The ratchet platform also includes a platform upper assembly actuator including a pedal sub-assembly and an upper linkage, wherein the upper linkage is attached to the pedal sub-assembly, and wherein actuation of the pedal sub-assembly actuates the upper linkage, and further wherein actuation of the upper linkage actuates the ratchet to adjust the height of the ratchet platform. A base plate secured to the vehicle floor. Further, the ratchet platform includes a seat plate which provides support to the platform upper assembly, the platform lower assembly, and an energy attenuation system.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 7 illustrates a perspective view of a platform lower assembly;

FIG. 8 illustrates an exploded view of a platform lower assembly;

DETAILED DESCRIPTION OF THE PREFERRED EMBODIMENTS

Figure 1:
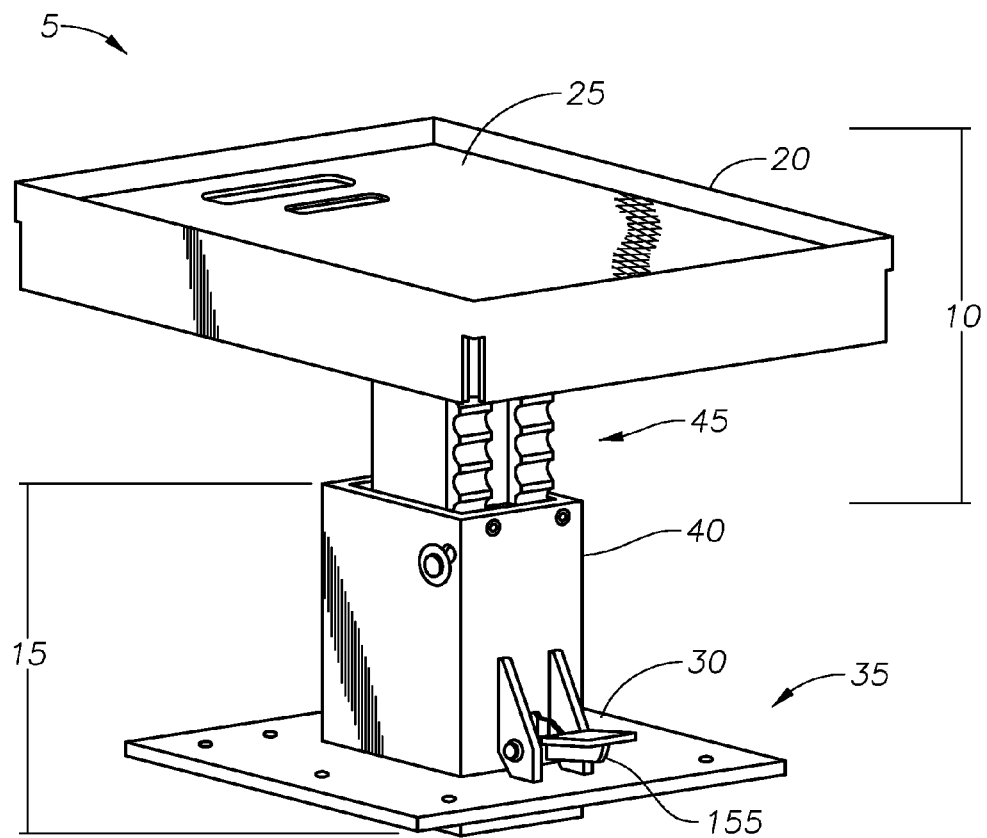
FIG. 1 illustrates a perspective view of a ratchet platform having a platform upper assembly and a platform lower assembly.
Figure 2:
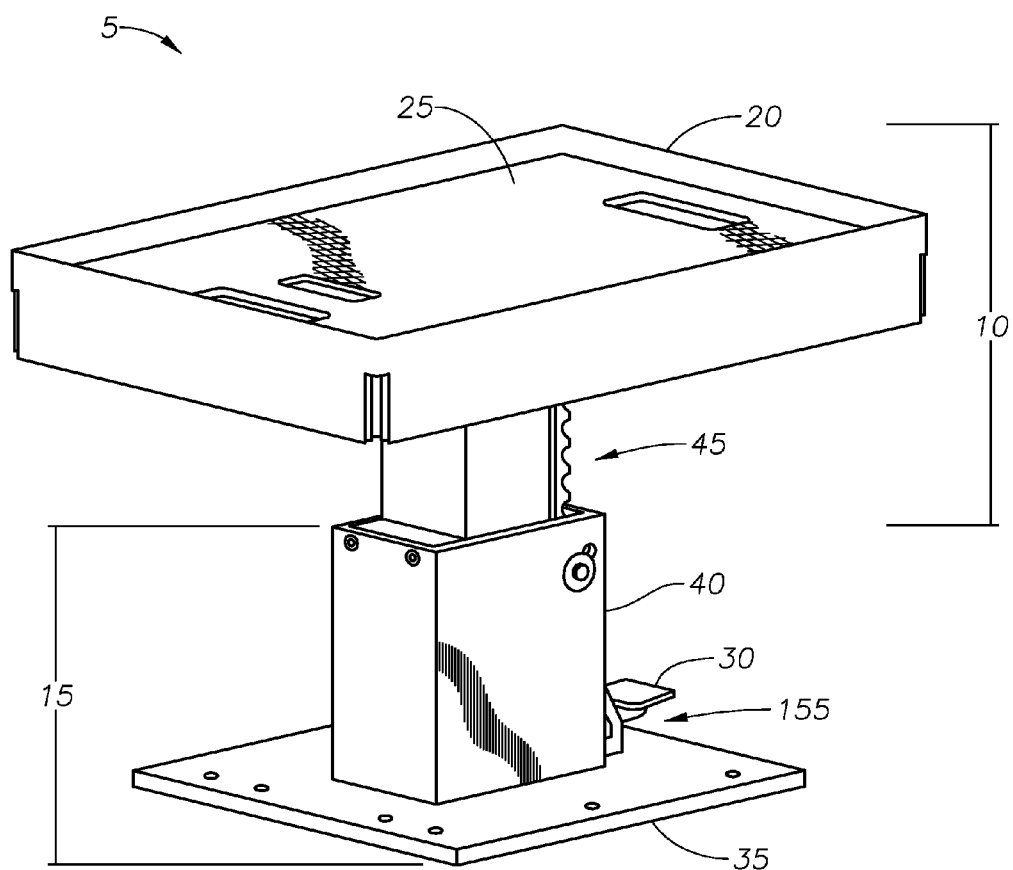
FIG. 2 illustrates a perspective view of a ratchet platform having a platform upper assembly and a platform lower assembly.
Figure 3:
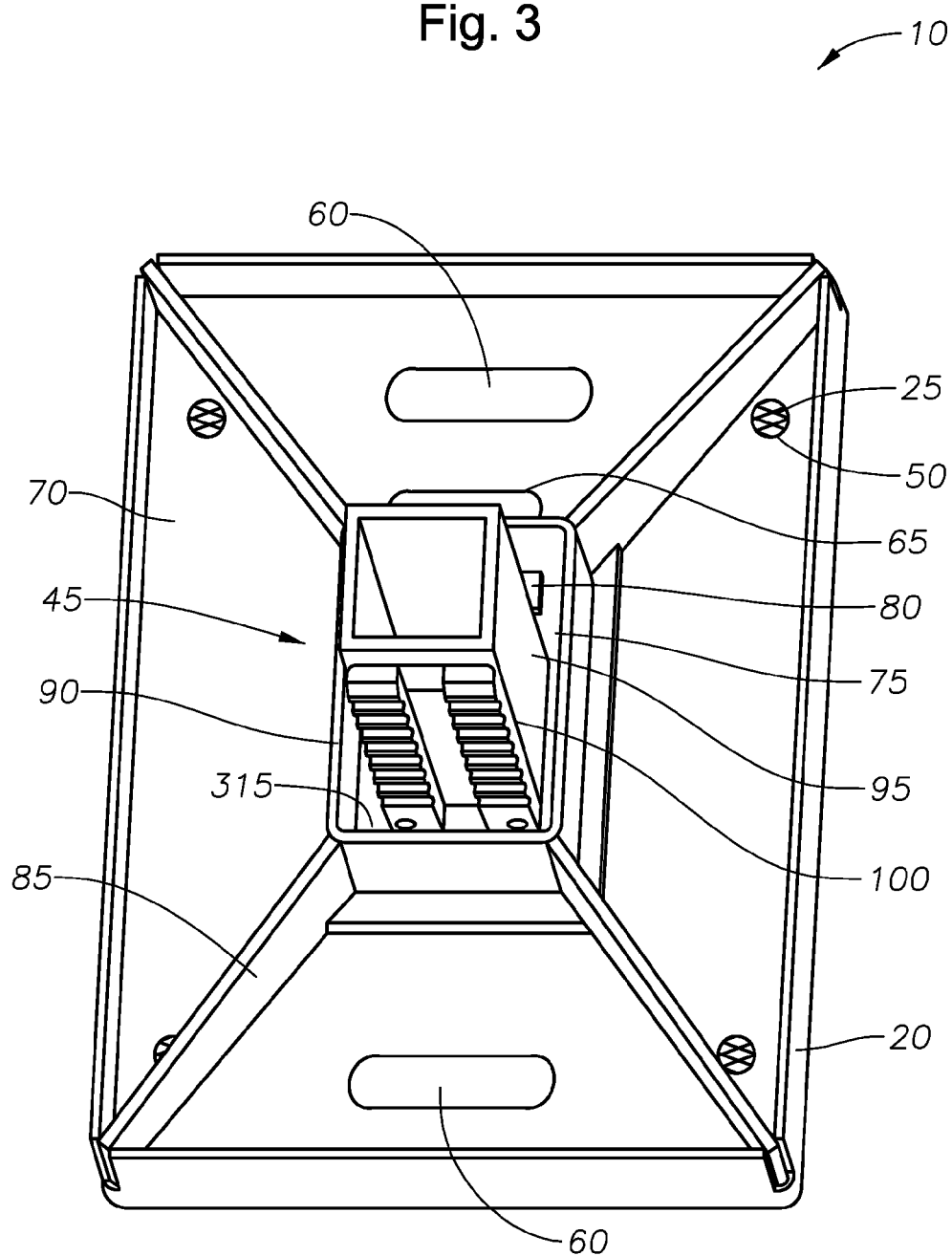
FIG. 3 illustrates a perspective bottom view of a platform upper assembly.

FIGS. 1 and 2 illustrate ratchet platform 5 having platform upper assembly 10 and platform lower assembly 15. Ratchet platform 5 is adapted for disposition within a vehicle. Platform upper assembly 10 includes toe queue 20, platform grating 25, and ratchet 45. Toe queue 20 is a wall that extends around the periphery of platform 70, as shown in FIG. 3. Without limitation, toe queue 20 facilitates prevention of an individual standing on ratchet platform 5 from falling off ratchet platform 5 by stopping sliding of a foot of the individual off ratchet platform 5. When the standing individual's foot contacts toe queue 20, toe queue 20 also provides notice to the standing individual that the individual's foot is at the edge of platform 70. Platform grating 25 has any configuration and material suitable for providing resistance against sliding of the standing individual's foot. Platform lower assembly 15 includes platform upper assembly actuator 30, platform base 35, and support column 40. Platform upper assembly actuator 30 may include any means for actuating vertical movement (i.e., up and down) of platform upper assembly 10 such as a pedal sub assembly, an electrical actuator, a crank actuator, and the like. In an embodiment as illustrated in FIGS. 1 and 2, platform upper assembly actuator 30 includes pedal sub assembly 155. Pedal sub assembly 155 actuates ratchet 45 and thereby actuates movement of platform upper assembly 10. Support column 40 provides support to platform 70 and also provides protection to the portion of platform upper assembly actuator 30 disposed within support column 40. Platform base 35 provides a base and support to platform upper assembly 10 and support column 40.

Figure 4:
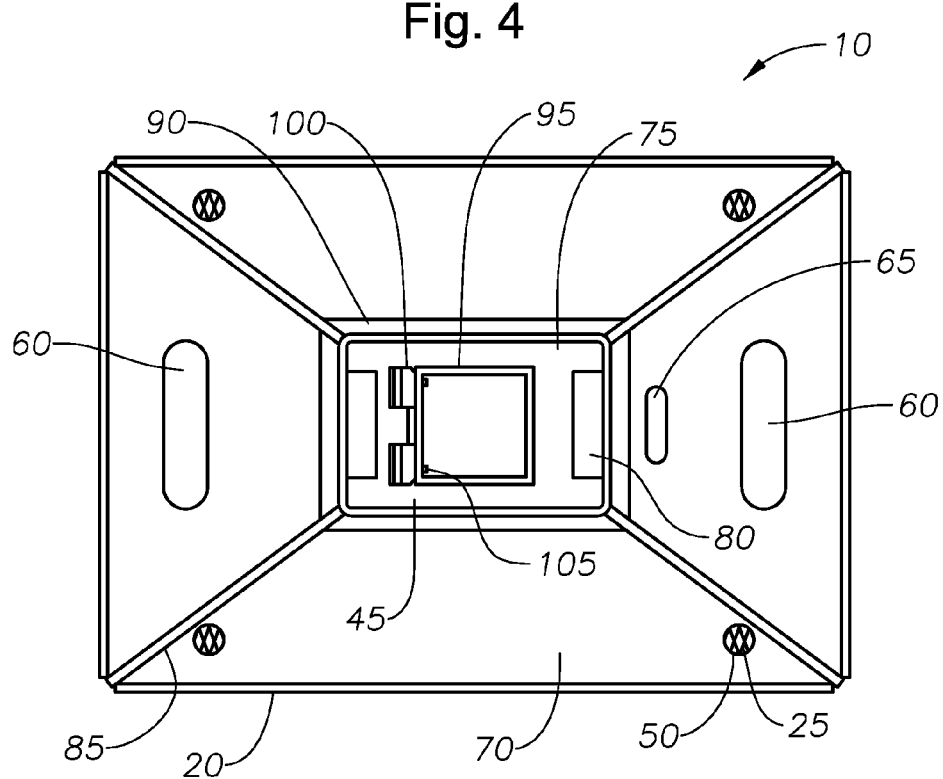
FIG. 4 illustrates a bottom view of a platform upper assembly.

FIG. 3 illustrates a bottom perspective view of platform upper assembly 10, and FIG. 4 illustrates a bottom view of platform upper assembly 10. As shown in FIGS. 3 and 4, platform upper assembly 10 includes platform 70. Platform 70 may be composed of any material having a suitable strength to support the weight of an individual standing on platform 70. Platform 70 is shown having a rectangular shape but it is to be understood that platform 70 is not limited to a rectangular shape but instead may have any shape suitable for use in a vehicle. Platform grating 25 is secured to platform 70 by any suitable method such as by welding, glue, and the like. Platform 70 also has openings 60. In an embodiment as illustrated in FIG. 3, openings 60 may be of a suitable configuration and size to allow an individual to pass a portion of the individual's hands therethrough for movement of ratchet platform 5. Openings 60 pass through platform 70 and platform grating 25. In alternative embodiments (not illustrated), openings 60 have any configuration and size suitable for a desired purpose. Platform 70 is shown with two openings 60 but in alternative embodiments (not illustrated) may have one opening 60 or more than two openings 60. Platform in 70 also has drains 50. Without limitation, drains 50 allow liquids disposed on the top side of platform 70 to pass through platform 70 via drains 50. Platform upper assembly 10 also includes platform tube core 75.

As shown in FIGS. 3 and 4, ratchet 45 includes platform riser tube 95 and ratchet rail 100. Ratchet 45 may be secured to platform 70 by any suitable method such as by weld, screws, glue, and the like. In an embodiment as illustrated in FIGS. 3 and 4, ratchet 45 is secured to platform tube core 75, which is secured to platform 70. Ratchet 45 is secured by securing upper portion 315 using any suitable means. Ratchet 45 is slidable within support column 40. Without limitation, platform tube core 75 provides reinforcement strength to platform 70. Further, without limitation, platform tube core 75 facilitates production. Platform tube core 75 may be secured to platform 70 by any suitable method. Platform riser tube 95 has a length sufficient to allow ratchet platform 5 to be adjusted to any desirable height of an individual standing on ratchet platform 5. Platform riser tube 95 also has a configuration suitable for slidable disposition within support column 40. Ratchet rail 100 is secured to a side of platform riser tube 95. In some embodiments, platform upper assembly 10 also includes crash blocks 80. Without limitation, crash blocks 80 prevent damage to upper tube guide 115 (not illustrated) from contact by support column 40. Crash blocks 80 are also secured to platform 70. In an embodiment as illustrated in FIGS. 3 and 4, crash blocks 80 are secured to platform 70 by securing of crash blocks 80 to platform tube core 75. In some embodiments, platform upper assembly 10 also includes platform gussets 85 and gusset wall 90. Platform gussets 85 are brackets that provide support to platform 70. In an embodiment as illustrated in FIGS. 3 and 4, platform upper assembly 10 includes four platform gussets 85 but in alternative embodiments (not illustrated) includes more than four or less than four platform gussets 85. Platform gussets 85 are secured to gusset wall 90 and/or a bottom side of platform 70. In an embodiment, gusset wall 90 extends about the periphery of platform tube core 75. As further shown in FIGS. 3 and 4, some embodiments of ratchet platform 5 include platform upper assembly 10 having an attachment opening 65 through platform 70 and platform grating 25.

Figure 5:
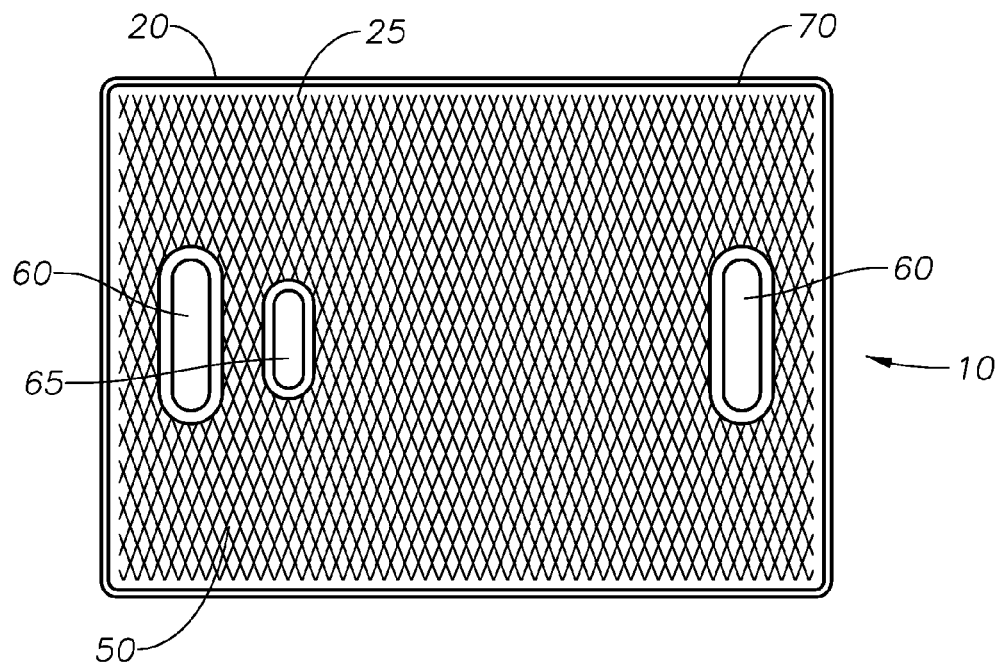
FIG. 5 illustrates a top view of a platform upper assembly.

FIG. 5 illustrates a top view of platform upper assembly 10. In an embodiment as illustrated, platform grating 25 substantially covers the top surface of platform 70 but not openings 60 and attachment opening 65. In embodiments as illustrated, openings 60 are disposed at locations on platform 70 sufficient to allow an individual to pick up and move ratchet platform 5.

Figure 6:
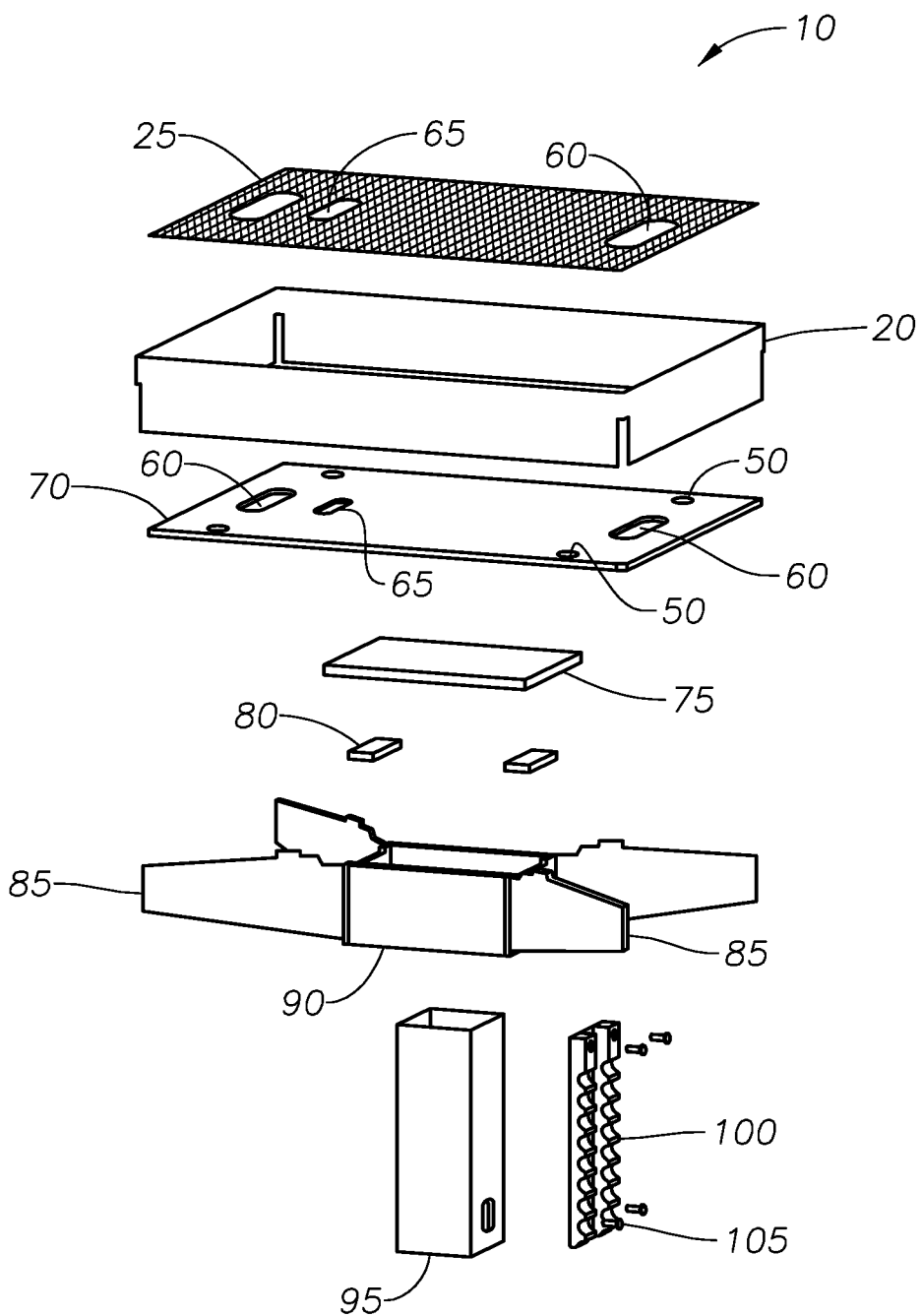
FIG. 6 illustrates an exploded view of a platform upper assembly.

FIG. 6 illustrates an exploded view of platform upper assembly 10. As shown, platform tube core 75 is disposed within gusset wall 90. In embodiments, ratchet rail 100 is secured to platform riser tube 95 by screws 105.

FIG. 7 illustrates a perspective bottom view of platform lower assembly 15. In embodiments as illustrated, a lower portion 190 of support column 40 passes through platform base 35. Without limitation, allowing lower portion 190 of support column 40 to pass through platform base 35 provides a desired range of adjustability. Support column 40 includes actuator grooves 170 on opposing sides of support column 40. In an embodiment, platform base 35 is adapted to be secured within a vehicle (i.e., to a floor of the vehicle).

FIG. 8 illustrates an exploded view of platform lower assembly 15. Support column 40 includes pedal opening 320 of sufficient dimensions to facilitate pedal sub assembly 155 (not illustrated). Pedal pivot supports 110 are disposed on opposing sides of pedal opening 320. Platform base 35 includes platform base opening 325 of sufficient dimensions to allow lower portion 190 to pass therethrough. In some embodiments, support column 40 is secured to platform base 35 by press fit.

Figure 9:
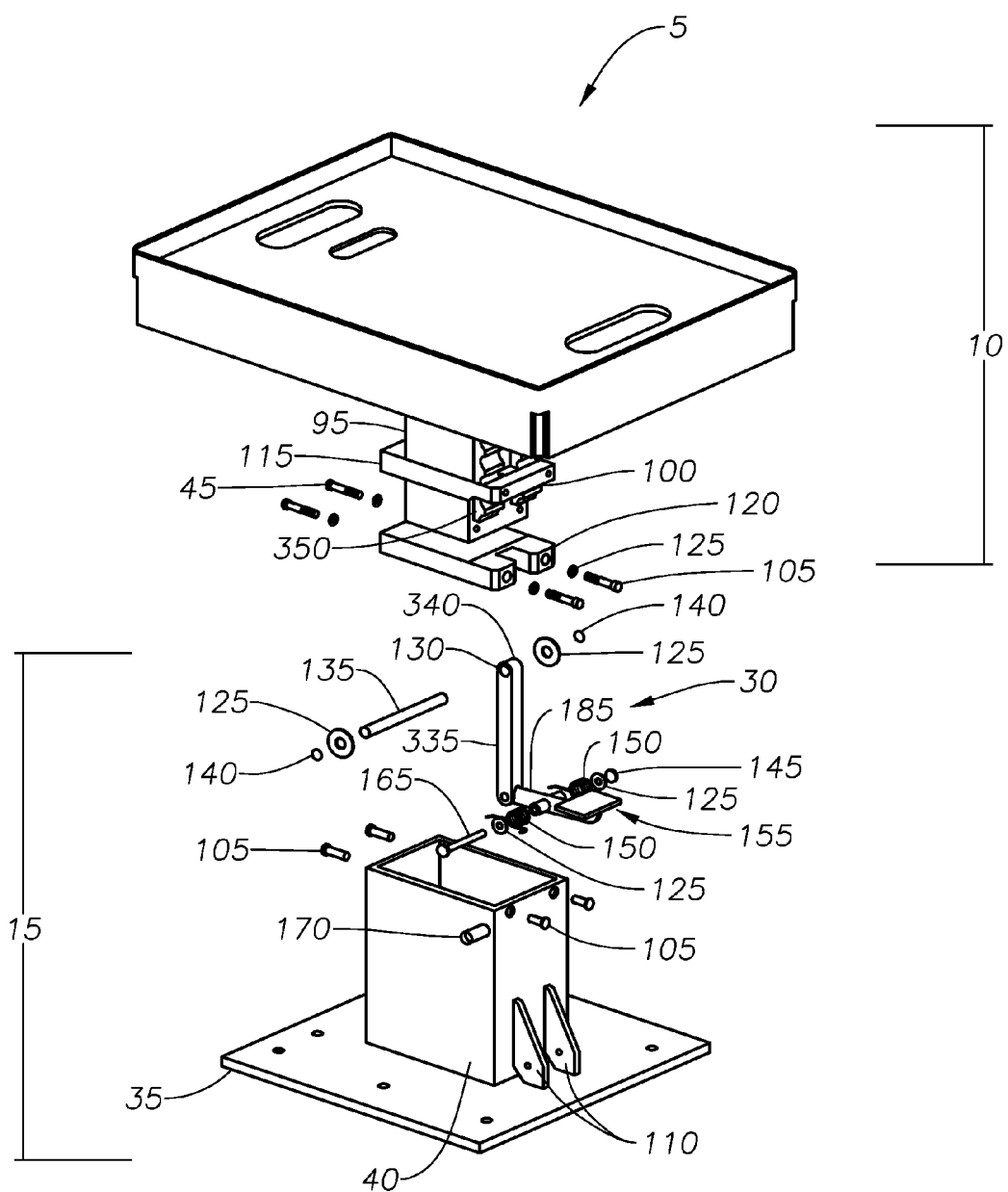
FIG. 9 illustrates a ratchet platform with an exploded view of a platform upper assembly actuator.
Figure 10:
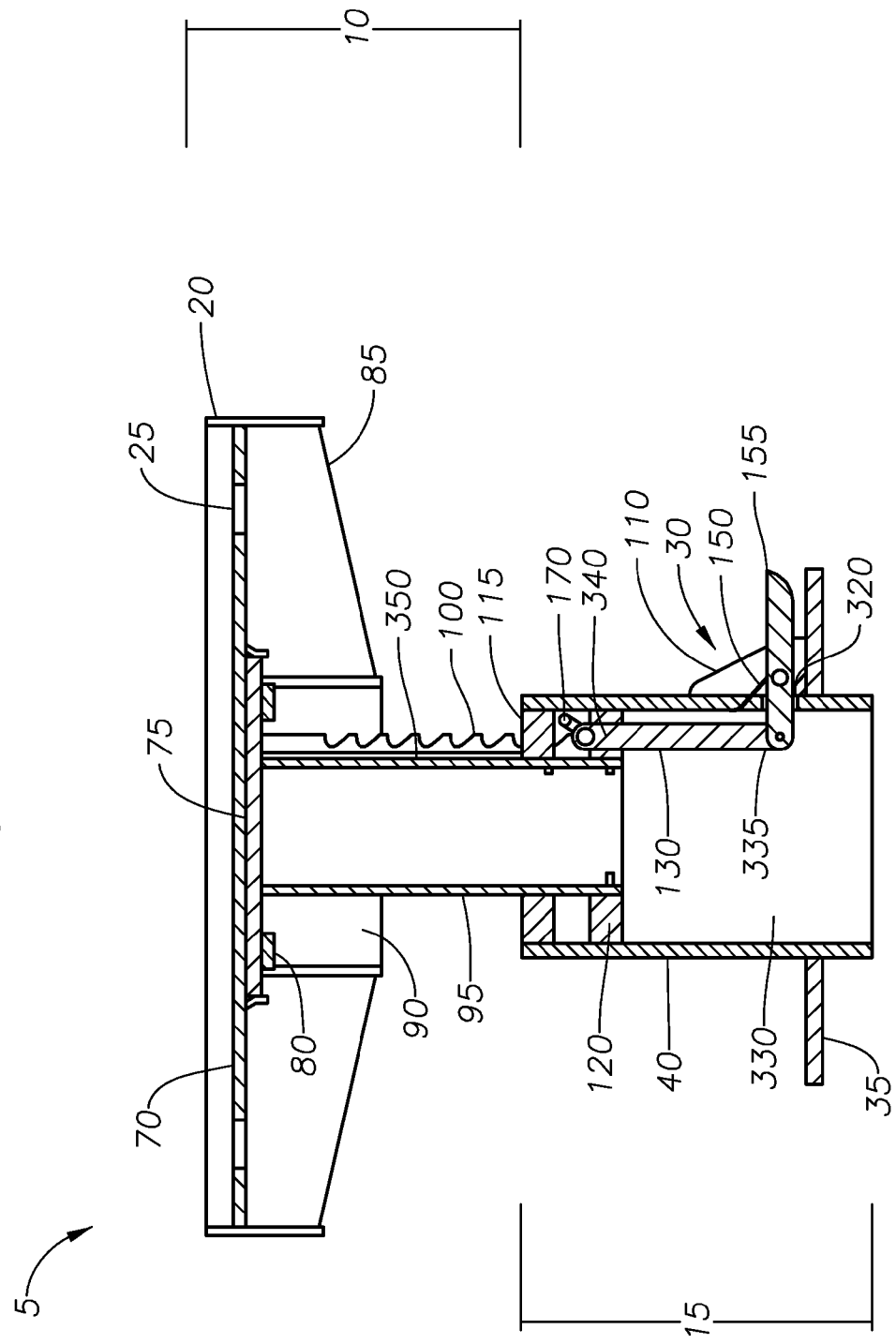
FIG. 10 illustrates a cross sectional side view of a ratchet platform.
Figure 11:
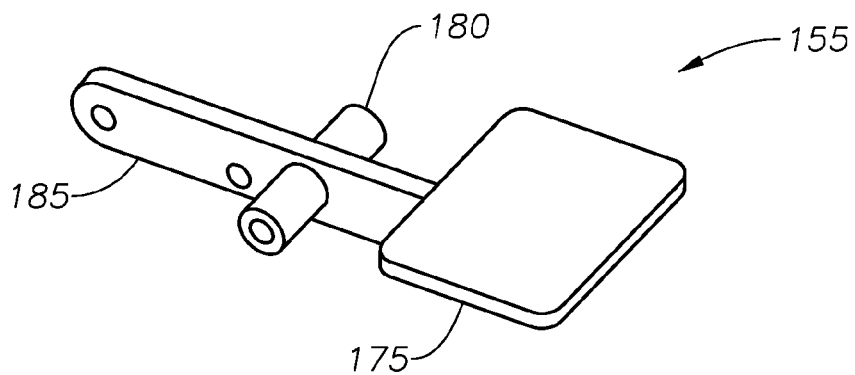
FIG. 11 illustrates a pedal sub assembly.
Figure 12:
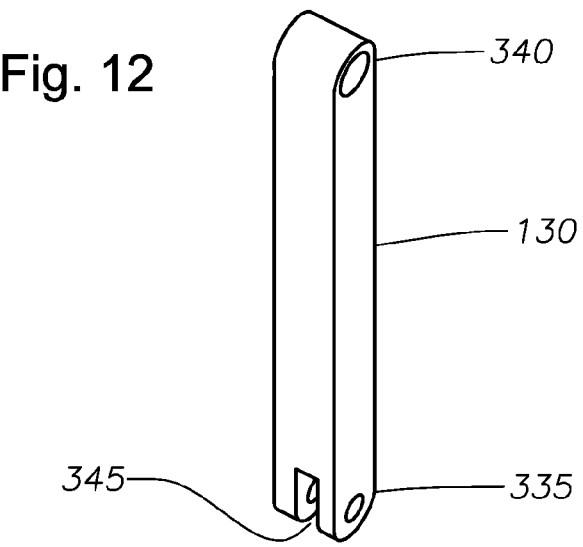
FIG. 12 illustrates an upper linkage.
Figure 13:
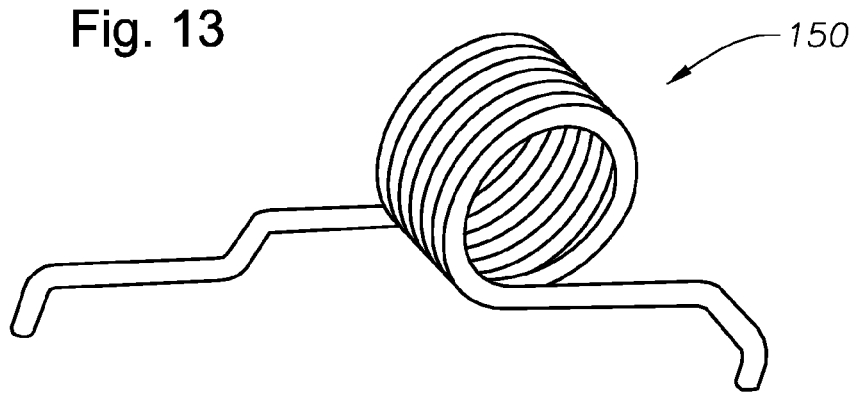
FIG. 13 illustrates a torsion spring.

FIG. 9 illustrates an embodiment of ratchet platform 5 in which platform upper assembly actuator 30 includes pedal sub assembly 155. In FIG. 9, platform upper assembly actuator 30 is shown in exploded view. FIG. 10 illustrates a cross sectional side view of the embodiment of ratchet platform 5 illustrated in FIG. 9. Platform upper assembly actuator 30 includes pedal sub assembly 155 and may have any suitable configuration for actuating platform upper assembly 10. As shown, a portion of pedal linkage 185 of pedal sub assembly 155 passes through pedal opening 320 into interior 330 of support column 40. Pedal sub assembly 155 may have any suitable configuration for actuation. FIG. 11 illustrates an embodiment of pedal sub assembly 155 in which pedal sub assembly 155 includes pedal 175, pedal pivot pin 180, and pedal linkage 185. In an embodiment, pedal 175 has sufficient size to allow actuation by pressure from the foot of an individual. Pedal sub assembly 155 may be attached to support column 40 by any suitable method. In an embodiment as shown in FIGS. 9-11, bolt 165 passes through pedal pivot supports 110 and pedal pivot pin 180. Nut 145 secures bolt 165. In an embodiment, bolt 165 also passes through washers 125. In some embodiments, one or more torsion springs 150 are attached to pedal sub assembly 155. FIG. 13 illustrates a perspective view of a torsion spring 150. In embodiments as illustrated in FIGS. 9, 10, and 13, a torsion spring 150 is disposed on each side of pedal sub assembly 155 outside of the pedal pivot supports 110. The torsion springs 150 are attached to pedal sub assembly 155 by bolt 165. As shown in FIGS. 9 and 10, the portion of pedal linkage 185 in interior 330 is attached to upper linkage 130 at one end 335. Pedal linkage 185 and upper linkage 130 are rotatable in relation to each other at end 335. Upper linkage 130 runs longitudinally within interior 330 and is secured to support column 40 at the other end 340. An embodiment of upper linkage 130 is illustrated in FIG. 12 in which upper linkage 130 has upper linkage groove 345. In an embodiment, the end of pedal linkage 185 opposite pedal 175 is disposed within upper linkage groove 345 and attached to upper linkage 130. In an embodiment as illustrated in FIGS. 9, 10, and 12, end 340 of upper linkage 130 is slidably attached to support column 40 by ratchet pin 135 passing through end 340 and actuator groove 170. Ratchet pin 135 may be secured by any suitable method. In an embodiment as illustrated in FIGS. 9 and 10, ratchet pin 135 is secured by washers 125 and external snap rings 140. Upper linkage 130 slides ratchet pin 135 longitudinally up through the length of actuator groove 170 when upper linkage 130 is in an upward motion and down through the length of actuator groove 170 when upper linkage 130 is in a downward motion. Ratchet pin 135 is suitably disposed within actuator groove 170 to allow teeth 350 of ratchet rail 100 to be disposed thereupon when ratchet pin 135 is in the downward position (i.e., at the bottom of actuator groove 170). Platform riser tube 95 passes through upper tube guide 115 and lower tube guide 120. Upper tube guide 115 and lower tube guide 120 are secured to support column 40. Actuator groove 170 is disposed on support column 40 between upper tube guide 115 and lower tube guide 120. Upper tube guide 115 and lower tube guide 120 prevent unwanted lateral movement of platform riser tube 95 and facilitate maintaining movement of platform riser tube 95 in a longitudinal direction. Upper tube guide 115 and lower tube guide 120 may be secured to support column 40 by any suitable method. In the embodiment as shown, upper tube guide 115 and lower tube guide 120 are secured to support column 40 by screws 105.

In operation of the embodiments of ratchet platform 5 illustrated in FIGS. 1-13, ratchet platform 5 is placed in a vehicle (not illustrated). Ratchet platform 5 is secured in a desirable location within the vehicle. Ratchet platform 5 may be secured by any suitable method such as by screwing ratchet platform 5 to a floor or other surface of the vehicle. The vehicle may include any vehicle such as a truck, car, military vehicle, helicopter, air plane, and the like. In an embodiment, ratchet platform 5 is placed in a military vehicle in which it is desired for an individual to stand on platform 70. For instance, in some military vehicles, it is desired for an individual to operate weaponry (i.e., machine gun) that is located on the outside of the vehicle. In such an embodiment, a portion of the individual's body is disposed outside of the vehicle during operation of the weaponry with the remainder of the individual's body within the military vehicle for protection. The height of platform 70 is adjusted by pressing pedal 175. Each time pedal 175 is pressed, the pressure from pedal 175 actuates pedal linkage 185 and pedal linkage 185 moves upwards, which thereby actuates upper linkage 130 longitudinally upward. The longitudinal movement of upper linkage 130 slides ratchet pin 135 longitudinally upward through the length of actuator groove 170. The upward movement of ratchet pin 135 applies force to a tooth 350 of ratchet rail 100 thereby actuating platform upper assembly 10, which moves upward. Pressure is released from pedal 175, and torsion spring 150 applies force to pedal linkage 185 to actuate pedal linkage 185 and move pedal linkage 185 downward, which actuates upper linkage 130 to move longitudinally downward. Such downward movement of upper linkage 130 slides ratchet pin 135 downward through the length of actuator groove 170 to allow the tooth 350 below the previous tooth 350 (in which the force was applied) to be disposed upon ratchet pin 135. By such disposition of the next tooth 350 upon ratchet pin 135, further downward movement of platform upper assembly 10 is prevented. Pedal 175 may be pressed and released until platform 70 is at the desired height. To reduce the height of platform 70, pedal 175 is pressed and held, which maintains ratchet pin 135 in an upper position within actuator groove 170. With ratchet pin 135 maintained in an upper position within actuator groove 170, ratchet pin 135 is not in contact with teeth 350, and platform upper assembly 10 slides downward until the pressure is released from pedal 175 or support column 40 contacts platform 70. As platform upper assembly 10 slides downward, platform riser tube 95 slides downward in interior 330.

Figure 14:
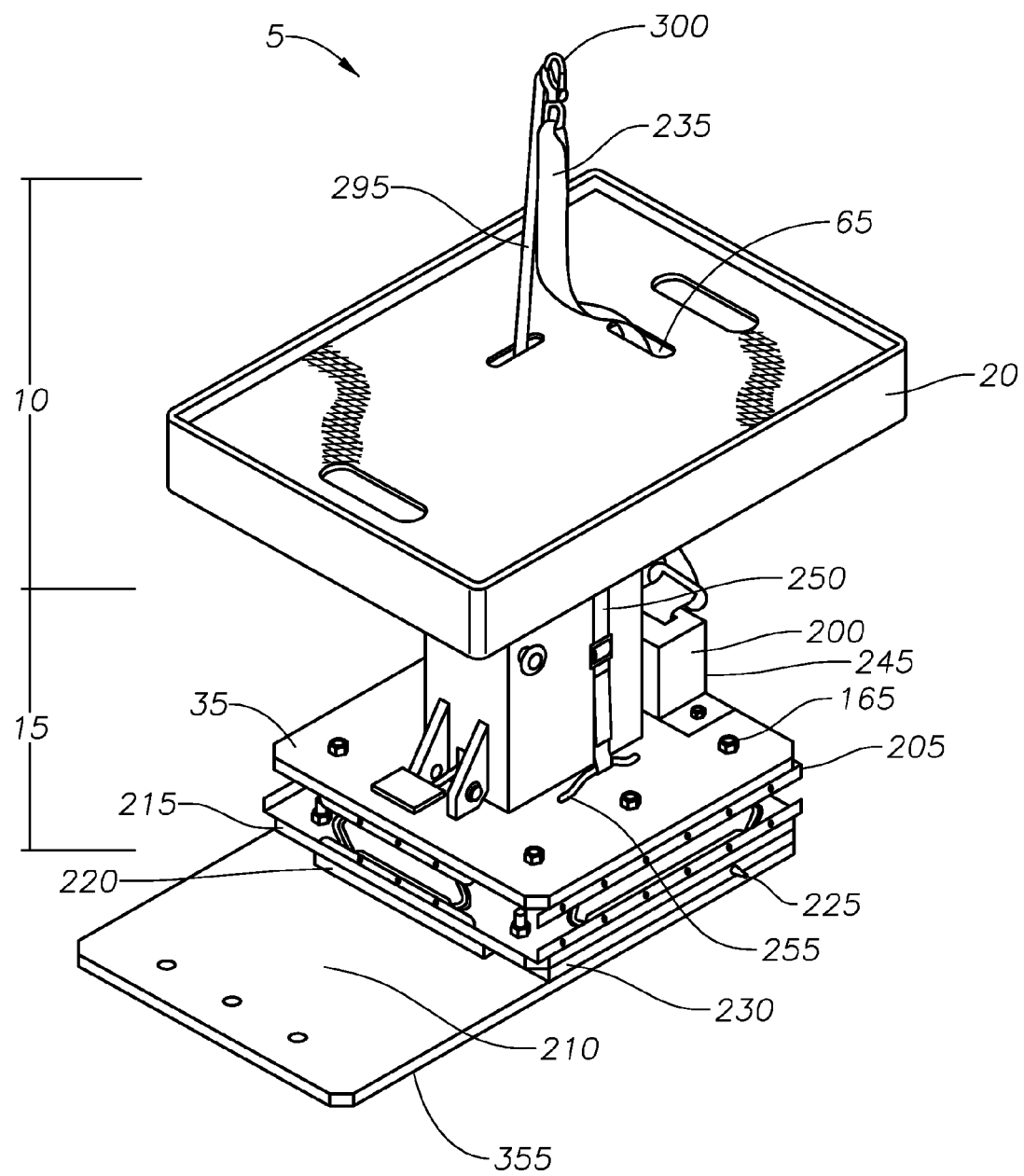
FIG. 14 illustrates a ratchet platform having a platform upper assembly, a platform lower assembly, a ratchet platform attachment means, an energy attenuation system, a base plate, and a seat plate.
Figure 15:
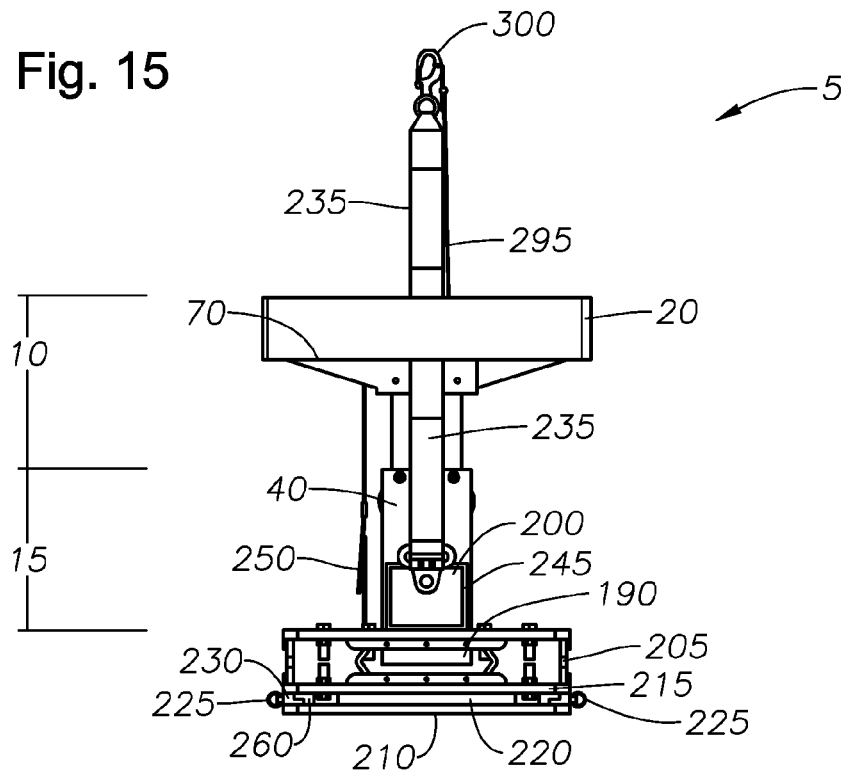
FIG. 15 illustrates a side view of the ratchet platform of FIG. 14.
Figure 16:
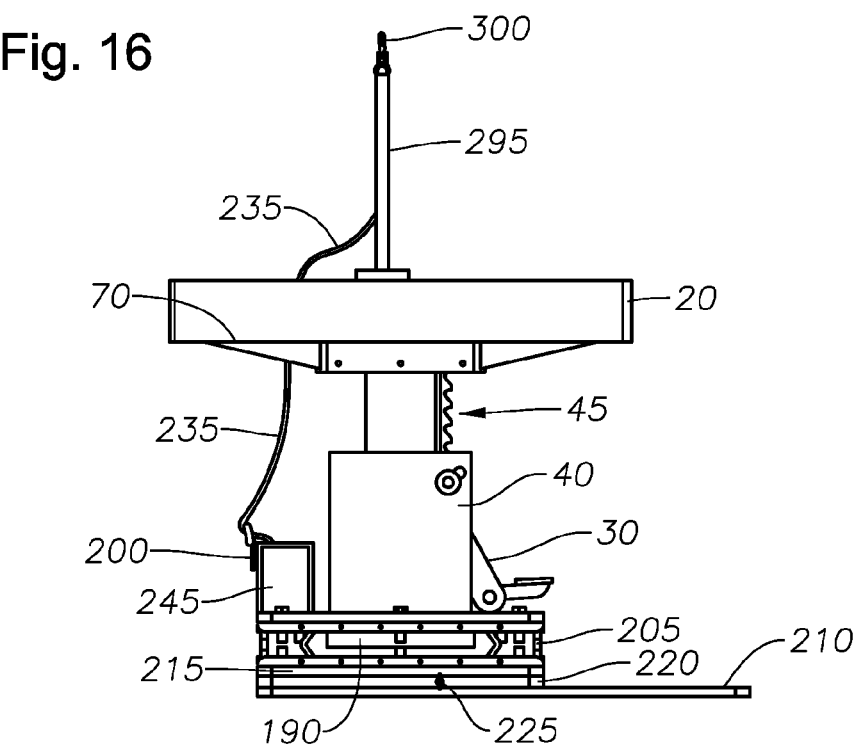
FIG. 16 illustrates a side view of the ratchet platform of FIG. 14.

FIG. 14 illustrates a perspective view of an embodiment of ratchet platform 5 in which ratchet platform 5 further includes energy attenuation system 205. FIGS. 15 and 16 illustrate side views of an embodiment of ratchet platform 5 including energy attenuation system 205. Energy attenuation system 205 includes any system suitable for reducing or preventing energy applied to the bottom 355 of ratchet platform 5 from passing to the individual standing on platform 70. For instance, in an embodiment in which ratchet platform 5 is disposed within a military vehicle, a mine or improvised explosive device exploding underneath or near the military vehicle applies force to the military vehicle and thereby to ratchet platform 5. Energy attenuation system 205 reduces or prevents the energy from passing through ratchet platform 5 to the individual standing on platform 70, thereby protecting the individual from harm. Without limitation, an example of a suitable energy attenuation system 205 includes a SHOCK-RIDE CRUSH BOX, commercially available from Armor-Works Enterprises, LLC. Energy attenuation system 205 is secured to platform base 35. In an embodiment, energy attenuation system 205 is secured to a bottom side of platform base 35.

Figure 17:
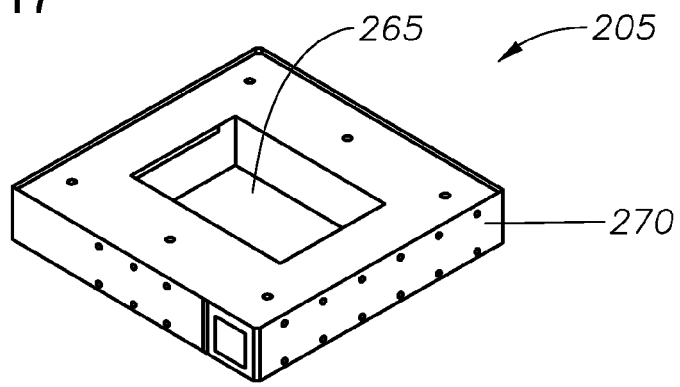
FIG. 17 illustrates an energy attenuation system.

FIG. 17 illustrates a perspective view of an embodiment of energy attenuation system 205 including outer covering 270. Outer covering 270 is secured to the periphery of energy attenuation system 205. In an embodiment, outer covering 270 is removeable. Without limitation, outer covering 270 prevents unwanted objects from being disposed within energy attenuation system 205. In an embodiment as illustrated in FIG. 17, energy attenuation system 205 also includes energy attenuation opening 265, which is an opening through the interior of energy attenuation system 205. In an embodiment, energy attenuation opening 265 has suitable dimensions to allow ratchet 45 to pass therethrough.

Figure 18:
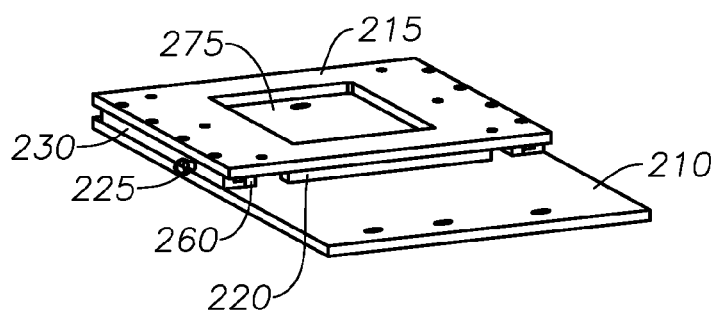
FIG. 18 illustrates a base plate and a seat plate.
Figure 19:
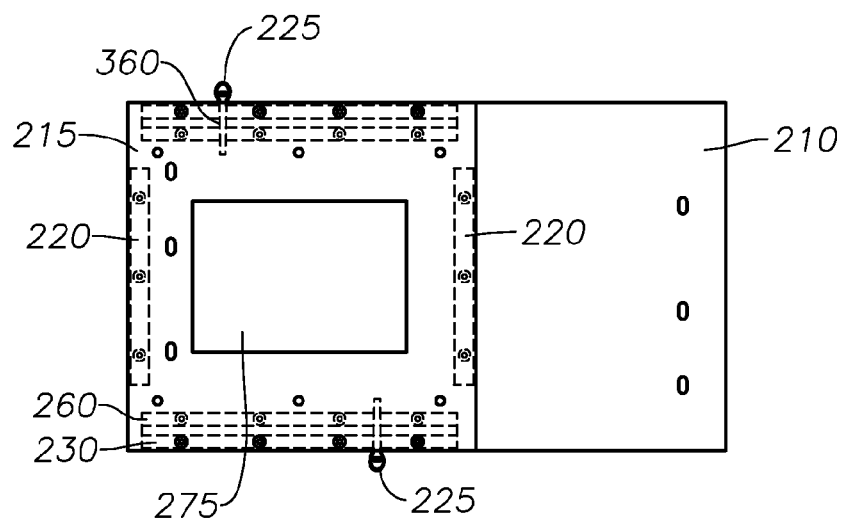
FIG. 19 illustrates a cross sectional top view of a seat plate and a base plate.
Figure 20:
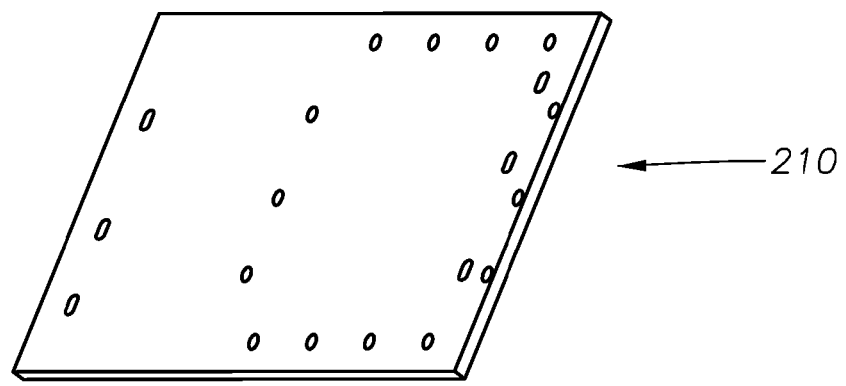
FIG. 20 illustrates a base plate.
Figure 21:
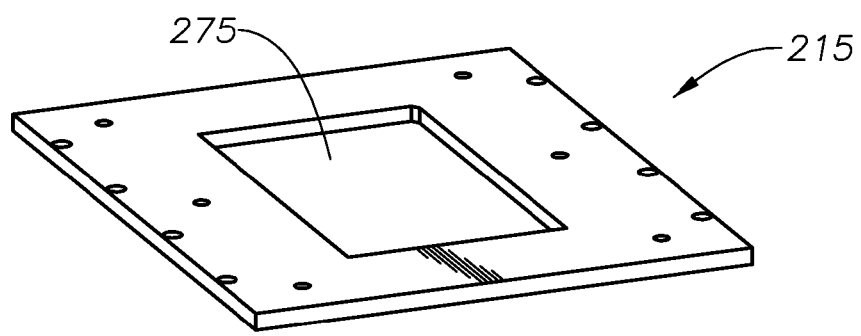
FIG. 21 illustrates a seat plate.
Figure 22:
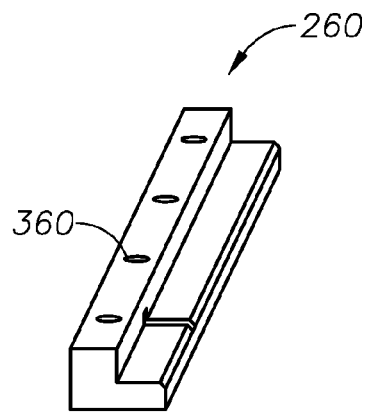
FIG. 22 illustrates a base plate rail.
Figure 23:
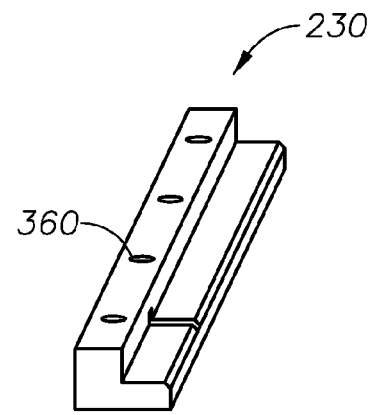
FIG. 23 illustrates a seat plate rail.
Figure 24:
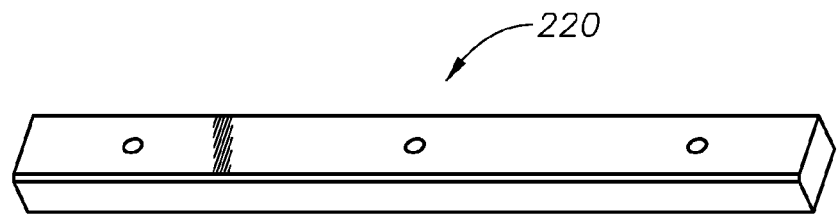
FIG. 24 illustrates a base plate shim bar.
Figure 25:
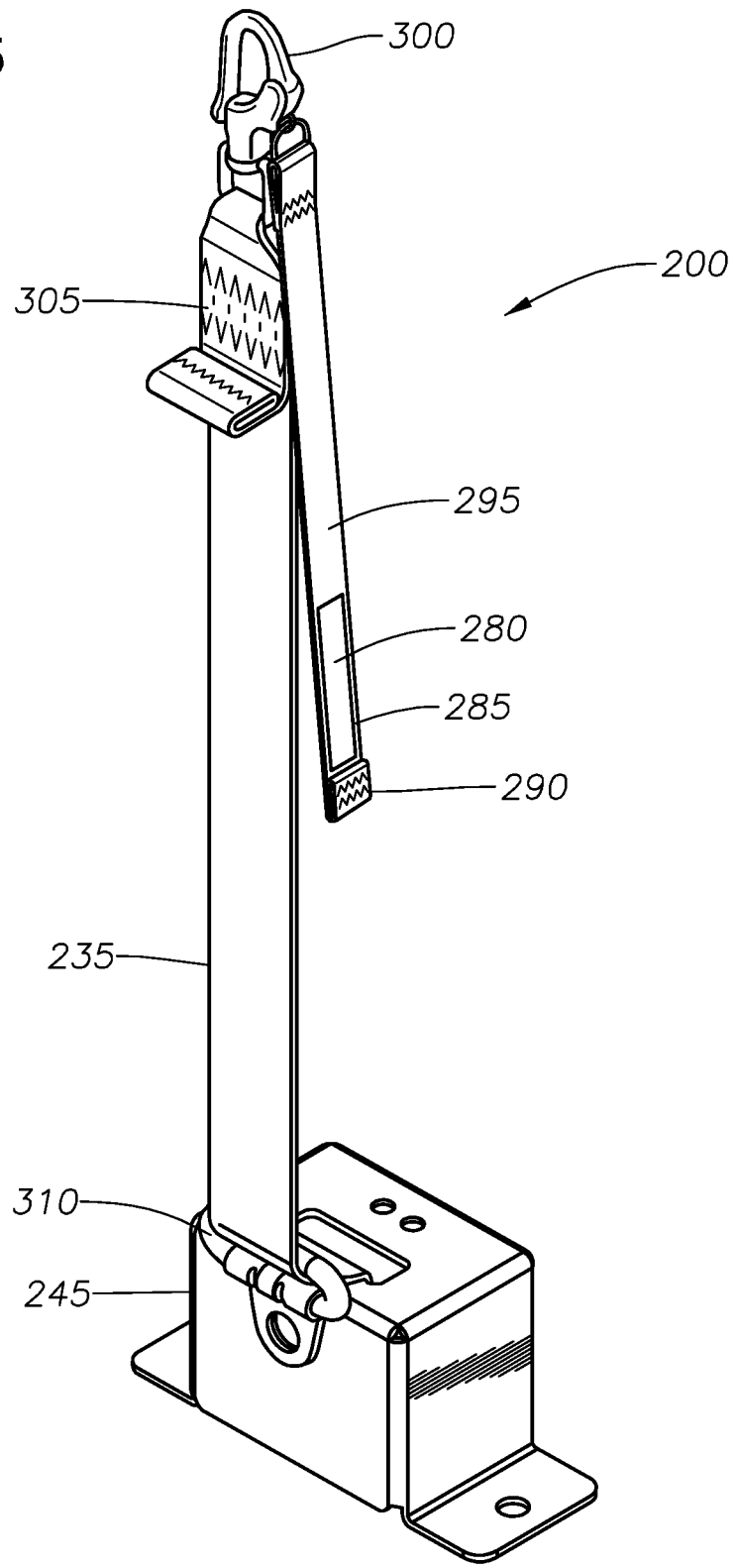
FIG. 25 illustrates a ratchet platform attachment means.

In some embodiments as illustrated in FIGS. 14-16, ratchet platform 5 further includes base plate 210 and seat plate 215. FIG. 18 illustrates a perspective view of base plate 210 and seat plate 215. FIG. 19 illustrates a top cross sectional view of base plate 210 and seat plate 215. Seat plate 215 is secured to platform base 35 or, in embodiments in which ratchet platform 5 includes energy attenuation system 205, to energy attenuation system 205. Seat plate 215 provides support to platform upper assembly 10, platform lower assembly 15, and energy attenuation system 205. Seat plate 215 includes seat plate rails 230 on opposing sides of seat plate 215. In embodiments as illustrated in FIGS. 18, 19, and 21, seat plate 215 further includes seat plate opening 275, which has a configuration suitable to allow ratchet 45 to pass therethrough. In an embodiment, base plate 210 has a length greater than seat plate 215. Base plate 210 is secured to the vehicle. In some embodiments, base plate 210 is secured to the floor of the vehicle. Base plate 210 has base plate rails 260 on opposing sides of base plate 210. Each base plate rail 260 has slidable contact with the opposing seat plate rail 230 whereby seat plate 215 is longitudinally slidable along base plate 210 with seat plate rails 230 moving longitudinally along the stationary base plate rails 260. FIGS. 22 and 23 illustrate embodiments of base plate rails 260 and seat plate rails 230, respectively. As shown, the configurations of seat plate rails 230 and base plate rails 260 match each other. Longitudinal movement of seat plate 215 in relation to base plate 210 allows platform upper assembly 10, platform lower assembly 15, and energy attenuation system 205 to be positioned in different horizontal directions. Seat plate release pins 225 are inserted through a pin opening 360 of base plate rail 260 when matched with a pin opening 360 of seat plate rail 230 to prevent movement of seat plate 215 and lock seat plate 215 in place. The seat plate release pins 225 are inserted on opposing sides of base plate 210 and seat plate 215. In alternative embodiments (not illustrated), seat plate release pins 225 are inserted on the same side of base plate 210 and seat plate 215. In other alternative embodiments (not illustrated), only one seat plate release pin 225 is used or more than two seat plate release pins 225 are used. In some embodiments, base plate 210 includes base plate shim bars 220. An embodiment of base plate shim bar 220 is illustrated in FIG. 24. Without limitation, shim bars 200 limit the amount of energy that is stored in base plate 210 in an improvised explosive device (IED) event by minimizing its deflection. FIG. 20 illustrates a perspective view of an embodiment of base plate 210.

In other embodiments as illustrated in FIGS. 14-16, ratchet platform 5 also includes ratchet platform attachment means 200. Ratchet platform attachment means 200 includes any means suitable for attaching ratchet platform 5 to other objects such as an individual standing on platform 70. In an embodiment as illustrated in FIGS. 14-16 and FIG. 25, ratchet platform attachment means 200 includes strap 235, strap retractor 245 and release hook 300. Strap retractor 245 is a device suitable for retracting strap 235 and for allowing extraction of strap 235 from strap retractor 245.

In embodiments, strap retractor 245 retracts strap 235 upon strap thresholds being identified as achieved. Strap thresholds include any suitable criteria for retraction of strap 235. In an embodiment, the strap thresholds include angle, acceleration, temperature, or any combination thereof. In embodiments, the strap thresholds are adjustable. For instance, without limitation, the strap thresholds may be adjusted according to the terrain or use of ratchet platform 5. The angle may be any desirable angle. It is to be understood that angle refers to a degree of tilt of the vehicle in which ratchet platform 5 is secured. In embodiments, the angle is above about 33 degrees, alternatively above about 37 degrees, alternatively above about 40 degrees, and alternatively above about 43 degrees. In some embodiments, ratchet platform 5 includes a sensor that operates as an angle sensor mechanism. The angle sensor mechanism may be disposed at any suitable location on the vehicle or on ratchet platform 5. In embodiments, strap retractor 245 includes the angle sensor mechanism. The angle sensor mechanism may include any type of sensor that determines the angle of tilt of the vehicle. The acceleration may include any desirable acceleration of the extraction of strap 235 from strap retractor 245. In embodiments, strap retractor 245 includes a sensor that determines the acceleration of the extraction of strap 235. As an example, without limitation, the strap threshold for strap retractor 245 is set to above about 43 degrees. Upon the angle sensor mechanism sensing the vehicle exceeding an angle of about 43 degrees, strap retractor 245 retracts strap 235 and thereby retracts the individual (i.e., soldier). Without limitation, an example of strap retractor 245 is a seat belt retractor (i.e., a seat belt retractor used in automobiles but with sufficient strength to retract the individual).

The threshold temperature may be any desirable temperature. In an embodiment, the temperature threshold is above about 250° F., alternatively above about 300° F. The temperature threshold may be determined by any suitable means. In an embodiment, the temperature threshold is determined by one or more temperature sensors that measure the temperature on an outside or inside location of the vehicle. For instance, without limitation, if an explosive device contacts the vehicle, the temperature sensor will determine the increased temperature from the explosive device.

The angle sensor mechanism may be powered by an suitable means such as by battery. In an embodiment, the angle sensor mechanism is electrically connected to the vehicle's electrical system. In such an embodiment, the angle sensor mechanism receives its power from the vehicle's electrical system. In an embodiment, the sensor is disposed (i.e., secured) on the floor of the vehicle.

Strap 235 includes any suitable type of strap. For instance, in an embodiment, strap 235 includes a long, narrow strip of pliant material such as webbing. In alternative embodiments (not illustrated), strap 235 is a cable. In an embodiment, strap 235 passes through strap ring 310 before entering and after exiting strap retractor 245. Without limitation, strap ring 310 facilitates extraction and retraction of strap 235. A release hook 300 is attached to the end of strap 235 opposite strap retractor 245. Release hook 300 includes any type of hook suitable for attaching to an object. In embodiments, the object is an individual disposed on platform 70 (i.e., a gunner). In an embodiment as illustrated, release hook 300 is a quick release hook with a swivel. In some embodiments, ratchet platform attachment means 200 includes release strap 295. Release strap 295 is attached to release hook 300, and a sufficient pulling force on release strap 295 releases release hook 300. In an embodiment, release strap 295 includes a visual 280. Visual 280 includes any means for increasing visibility of release strap 295. In an embodiment, visual 280 includes fluorescent material. Visual 280 is secured to release strap 295 by any suitable means such as by stitching 285. In an embodiment, release strap 295 also includes grip 290 at the end of release strap 295 opposite the end of release strap 295 attached to release hook 300. In an embodiment, ratchet platform attachment means 200 includes strap adjustment 305. Strap adjustment 305 includes any means suitable for attaching release hook 300 to strap 235 such as VELCRO, which is a registered trademark of Velcro Industries N.V.

In an embodiment as illustrated in FIGS. 14-16, strap retractor 245 is secured to platform lower assembly 15. In an embodiment, strap retractor 245 is secured to platform base 35. In an embodiment in which ratchet platform 5 includes energy attenuation system 205, strap retractor 245 is secured to platform base 35 and energy attenuation system 205. In an embodiment (not illustrated), securing means such as bolts secure strap retractor 245 to platform base 35 and energy attenuation system 205. In such an embodiment, on the inside of energy attenuation system 205 are reinforcement strips through which the securing means (i.e., bolts) pass. Without limitation, the reinforcement strips facilitate securing of strap retractor 245 to platform base 35. For instance, the reinforcement straps prevent tension during a vehicle rollover from causing strap retractor 245 from separating from platform base 35 and energy attenuation system 205. In embodiments as illustrated, release hook 300 is passed through attachment opening 65.

In an embodiment as shown in FIGS. 14-15, ratchet platform 5 also includes ratchet platform attachment strap 250. An end of ratchet platform attachment strap 250 is secured to platform base 35. In an embodiment as illustrated, ratchet platform attachment strap 250 is secured to platform base 35 by strap receiving means 255. The other end of ratchet platform attachment strap 250 is attached to platform 70. Ratchet platform attachment strap 250 has sufficient tension to prevent unwanted extension of platform upper assembly 10. Without limitation, in an instance when the vehicle rolls over, the force of the roll over applies tension to platform upper assembly 10. Ratchet platform attachment strap 250 prevents the tension from causing unwanted extension of platform upper assembly 10.

It is to be understood that platform upper assembly 10 is not limited to platform 70, platform grating 25 and toe queue 20. In alternative embodiments (not illustrated), platform upper assembly 10 includes platform 70 and toe queue 20 or platform grating 25. In other alternative embodiments (not illustrated), platform upper assembly 10 includes platform 70 but does not include toe queue 20 and platform grating 25.

Although the present invention and its advantages have been described in detail, it should be understood that various changes, substitutions and alterations may be made herein without departing from the spirit and scope of the invention as defined by the appended claims.

What is claimed is:

1. A ratchet platform, wherein the ratchet platform is height adjustable, comprising:
   a platform upper assembly comprising a platform and a ratchet, wherein the ratchet comprises a platform riser tube and a ratchet rail secured to the platform riser tube;
   a platform lower assembly comprising a support column and a platform base, wherein the support column is secured to the platform base, and wherein an end of the ratchet is proximate the platform and an opposing end of the ratchet is disposed within an interior of the support column, and further wherein the platform base is adapted to be attached to a vehicle;
   a platform upper assembly actuator comprising a pedal sub-assembly and an upper linkage, wherein the upper linkage is attached to the pedal sub-assembly, and wherein actuation of the pedal sub-assembly actuates the upper linkage, and further wherein actuation of the upper linkage actuates the ratchet to adjust the height of the ratchet platform;
   a base plate secured to the vehicle floor and attached to the seat plate; and
   the seat plate which provides support to the platform upper assembly, the platform lower assembly, and an energy attenuation system; wherein the seat plate is secured to the energy attenuation system.

2. The ratchet platform of claim 1, further comprising a pedal pivot support, a pedal linkage, a pedal opening, and a torsion spring.

3. The ratchet platform of claim 2, wherein the pedal pivot support is disposed on an opposing side of the pedal opening from another pedal pivot support.

4. The ratchet platform of claim 2, wherein the pedal and a portion of the pedal linkage are disposed outside of the support column.

5. The ratchet platform of claim 2, wherein a portion of the pedal linkage is disposed within the interior of the support column.

6. The ratchet platform of claim 2, wherein the pedal linkage and the upper linkage are rotatable in relation to each other.

7. The ratchet platform of claim 2, further comprising more than one torsion spring.

8. The ratchet platform of claim 7, further comprising a torsion spring disposed on an opposing side of the pedal linkage from another torsion spring.

9. The ratchet platform of claim 1, wherein the energy attenuation system comprises an outer covering.

10. The ratchet platform of claim 9, wherein the energy attenuation system comprises a periphery, and wherein the outer covering is secured to the periphery.

11. The ratchet platform of claim 1, wherein the energy attenuation system comprises an energy attenuation opening.

12. The ratchet platform of claim 1, wherein the ratchet is passable through the energy attenuation opening.

13. The ratchet platform of claim 1, wherein the energy attenuation system is secured to the platform base.

14. The ratchet platform of claim 1, wherein the seat plate is slidably engaged with the base plate.

15. The ratchet platform of claim 1, further comprising a platform tube core disposed between the platform and the end of the ratchet proximate the platform.

16. The ratchet platform of claim 15, further comprising a crash block, and wherein the crash block is secured to the platform.

17. The ratchet platform of claim 16, further comprising a platform tube core, and wherein the crash block is secured to the platform tube core.

18. The ratchet platform of claim 16, further comprising an upper tube guide, and wherein the crash block prevents the upper tube guide from contacting the support column.

19. The ratchet platform of claim 1, further comprising a ratchet platform attachment strap, wherein the ratchet platform attachment strap is attached to the platform base and the platform upper assembly.

* * * * *